United States Patent [19]

Bruner

[11] 4,104,212
[45] Aug. 1, 1978

[54] NON-BIREFRINGENT GRANULAR STARCH LATEX THICKENER

[75] Inventor: Robert L. Bruner, Hinsdale, Ill.

[73] Assignee: CPC International Inc., Englewood Cliffs, N.J.

[21] Appl. No.: 745,147

[22] Filed: Nov. 26, 1976

[51] Int. Cl.$^2$ .............................................. C08L 3/02
[52] U.S. Cl. .................................... 260/17.3; 106/211; 106/213; 260/17.4 ST; 426/578; 428/95; 428/97; 536/102
[58] Field of Search ...................... 260/17.3, 17.4 ST; 106/211

[56] References Cited

U.S. PATENT DOCUMENTS

| | | | |
|---|---|---|---|
| 2,246,635 | 6/1941 | Möeller | 260/17.2 |
| 2,590,912 | 4/1952 | Yarber | 536/102 |
| 3,377,171 | 4/1968 | Ryan et al. | 106/211 |
| 3,443,990 | 5/1969 | Decnop | 106/211 |
| 3,485,776 | 12/1969 | Bruner et al. | 260/17.4 ST |
| 3,487,033 | 12/1969 | McElmury et al. | 260/17.3 |
| 3,644,332 | 2/1972 | Mooth et al. | 106/211 |
| 3,864,195 | 2/1975 | Patterson | 428/95 |
| 4,013,799 | 3/1977 | Smalligan | 426/578 |

OTHER PUBLICATIONS

Chem. Absts. 65:7440 b, Cold-Swelling Starch, Amylo Chemie, N.V.

Primary Examiner—Edward M. Woodberry
Attorney, Agent, or Firm—David H. LeRoy; John P. Floyd

[57] ABSTRACT

Covers a process for producing an improved substantially non-birefringent granular starch product comprising: heating an aqueous slurry of a granular birefringent starch to substantially eliminate the birefringence of the starch and to slightly swell the starch while retaining the granule structure; separating and dehydrating the partially swollen non-birefringent starch granules; and recovering the substantially non-birefringent granular starch product. Also covers the use of this product as a thickener to increase the viscosity and to improve the coating characteristics of latex compositions and said latex compositions.

16 Claims, No Drawings

NON-BIREFRINGENT GRANULAR STARCH LATEX THICKENER

FIELD OF INVENTION

The invention is concerned with a substantially non-birefringent granular starch product, its mode of formation, and its use in latex compositions to provide increased thickness and body.

BACKGROUND OF INVENTION

The use of various thickening agents to provide increased body and viscosity to latex compositions is well known. These thickening agents include natural gums, soluble cellulose derivatives, and a variety of high molecular weight synthetic polymers such as the sodium polyacrylate thickeners.

To obtain more economical latex compositions and provide desired viscosity and adhesive character, it is known in the art that 10 to 20% by weight of starch based on latex polymer solids have been used in latex formulations. However, the use of gelatinized or pregelatinized starches has certain drawbacks due to rheological effects which occur on aging.

Starch pastes are labile to shearing and hydrolyzing influences and yield latex compositions which are quite variable in their rheological properties. Also, the manufacture of uniform dried pregelatinized starches is difficult. Partially swollen or cooked starch products are known in the prior art. Unfortunately, there appears to be difficulty in stopping the swelling process in water at the desired point of swelling. A cooked or partially cooked starch which has been heated in the presence of certain disintegration inhibitors is described in U.S. Pat. No. 2,127,372.

U.S. Pat. No. 3,067,064 discloses a thin-boiling, free-flowing starchy material prepared without additives which will not thicken on heating or gel on cooling. The applicability of this starch as a latex thickener is not disclosed. Indeed the thin-boiling properties disclosed would lead one to conclude otherwise. The viscosity is disclosed as being substantially the same before heating, during heating, and on cooling.

This invention provides novel and improved latex compositions which are indeed suitable for use as carpet backing adhesives and other textile applications and which employ an improved substantially non-birefringent cold water swelling granular starch composition as a thickener for latex in applications such as carpet backing adhesives. As will be shown more fully hereafter, the modified starch compositions of this invention and the novel latex compositions produced therewith unexpectedly exhibit superior rheological and cured film properties for application in the manufacture of textile laminated and white-backed rugs or carpets. These properties are achieved without the necessity of having to employ a ternary mixture of modified starch urea, and borax as is disclosed, for example, in U.S. Pat. No. 3,779,857.

SUMMARY OF INVENTION

This invention relates to a process for producing an improved substantially non-birefringent cold water swelling granular starch product comprising:
(a) heating an aqueous slurry of a granular birefringent starch at a temperature within the range from about 130° to about 190° F. for at least about 15 seconds to about 60 seconds to substantially eliminate the birefringence of the starch and to slightly swell the starch while retaining the granular structure;
(b) separating and dehydrating the partially swollen non-birefringent starch granules; and
(c) recovering the partially swollen substantially non-birefringent granular starch product.

The present invention also relates to an improved substantially non-birefringent cold water swelling granular starch product having a moisture content below about 20% by weight characterized as having a viscosity from about 150 to about 650 centipoise at 10 percent solids after being dispersed in water at 1500 rpm for 2 minutes.

The present invention also relates to a latex composition having a viscosity in the range from about 200 to about 50,000 centipoise comprising:
(a) a latex resin; and
(b) a substantially non-birefringent cold water swelling granular starch thickening agent characterized as having a viscosity from about 150 to about 650 centipoise at 10 percent solids after being dispersed in water at 1500 rpm for 2 minutes.

DESCRIPTION OF PREFERRED EMBODIMENTS

According to this invention, there is provided a process for producing an improved substantially non-birefringent cold water swelling granular starch product. The process comprises heating an aqueous slurry of a granular birefringent starch to substantially liminate the birefringence and slightly swell the starch granules. The starch must not be heated to a temperature high enough to significantly destroy the starch granules. The swollen starch granules are separated from the aqueous portion of the slurry and dehydrated and a substantially non-birefringent granular cold water swelling starch product is recovered.

The starting starch material that may be used in practicing the invention may be derived from any vegetable source, such as, for example, corn, wheat, potato, tapioca, rice, sago, and grain sorghum. Waxy starches may also be used. The term "starch" is used broadly herein and encompasses unmodified starch and tailings, and, as well, starch that has been somewhat modified by treatment with acids, enzymes, oxidizing agents, or derivatizing agents.

The preferred starch product especially adapted for use in latex compositions are produced by heating an aqueous slurry of the granular birefringent starch just sufficiently so that the birefringence of the starch is substantially eliminated and the starch granules are partially swollen and still remain as distinct granules. The starch must not be heated to the extent that complete gelatinization and loss of granular character has occurred.

When viewed through a microscope under polarized light, native starches have a maltese cross pattern. Native starches have a distinct shape, size and appearance when viewed through a microscope with normal lighting. Native starches are further characterized by X-ray diffraction wherein the "A" pattern is indicative of the crystallinity of native starches.

Fully gelatinized starches when viewed under the microscope with polarized light have no maltese cross pattern. Under normal light, iodine stained gelatinized starches have non-distinct patterns which are ghostly in appearance indicative of fragmented, ruptured, and almost completely solubilized particles representing complete loss of the original native state. Drying of a gelatinized starch produces a starch solid product referred to as a "pregelatinized starch." When dispersed in water and observed through a microscope, pregelatinized starches closely resemble the gelatinized starches. Furthermore, fully gelatinized and pregelatinized starches have no crystallinity pattern as observed by X-ray diffraction. Pregelatinized starches appear to be composed of shards or fragments if derived from roll drying or of beadlets containing entrained air if derived from spray drying. In the formation of latex compositions, the prior art has used fully gelatinized or fully solubilized starches in contrast to the starch products of this invention.

The term "cold water swelling" is used herein to describe a starch product which will absorb water and swell on contact with an aqueous liquid. Pregelatinized starches are characteristically cold water swelling.

While the starch products according to this invention are fully granular, they are nevertheless characterized as being cold water swelling. The starch products of this invention are also substantially non-birefringent and have essentially no maltese cross patterns when observed under polarized light with a microscope. X-ray diffraction of the starch products of this invention show that no crystallinity remains as evidenced by the loss of the "A" pattern. When reslurried in water and viewed with a microscope under normal light, a distinctly non-fragmented and intact granule is visible. Under the microscope the starch granule or particle appears to be in an intermediate state of swelling wherein the particle size is larger than the native starch and smaller than the fully swollen gelatinized starch. and smaller than the fully swollen gelatinized starch.

According to the processes of this invention a substantially non-birefringent, cold water swelling, granular starch product has been produced by carefully controlling the temperature and holding time of an aqueous slurry of the native starch product without the necessity of disintegration inhibitors. Furthermore, the non-birefringent cold water swelling granular starch product of this invention has been found to be a surprisingly effective additive for latex coating and adhesive compositions. According to this invention the substantially non-birefringent, cold water swelling, granular starch product is useful as a latex extender and as a replacement for expensive thickeners normally used in latex compositions.

Pre-swollen starches of the prior art characteristically exhibit high viscosities in water. The viscosity of latex formulations prepared with those starches is unpredictable. With the starch products of this invention, a uniform and predictable viscosity can be achieved. It is believed that this is due to a combination of the non-birefringent cold water swelling properties with the retention of the granular structure of the starch product of this invention.

Only through careful control can a starch product having the desired reproducible viscosity characteristic be produced. The granular or native starch must be heated for a minimum time within a desired temperature range to produce the product of the invention.

According to this invention, the preferred temperature range for controlling the change from the native, birefringent, unswollen granular state to the substantially non-birefringent partially swollen, granular state is from about 130° to about 190° F. Most preferably, it has been found that a temperature range from about 160° to about 170° F. will sufficiently limit the swelling and produce the desired cold-water swelling, substantially non-birefringent, granular starch product of this invention. Holding time at the selected temperature range must be from at least about 15 seconds to about 60 seconds, although longer times are not harmful. In the process of this invention, the native or granular starch is slurried in excess water preferably at about 5 to about 10% starch solids and held at the desired temperature for a sufficient time to produce the substantially non-birefringent, partially swollen, granular starch product. For use as a latex thickener, the starch product of this invention may be obtained by spray drying.

The dehydrated product produced according to this invention must have a moisture content below about 20% by weight and preferably less than about 10%. The product of this invention is further characterized in that a 10% starch paste prepared by dusting 25 g. dry basis starch product into 225 ml. of water with 1500 rpm agitation and stirred for 2 minutes then exhibits a Brookfield viscosity from about 150 to about 650 centipoise and has a bulk density of 31 pounds per cubic foot.

The large scale formulation of latex coating and laminating adhesive compositions is inherently difficult. Such mixtures commonly include up to 600 parts of various fillers known to the art per 100 parts dry basis by weight of an aqueous resin emulsion. These fillers may, for example, be any of the group including clay, ground chalk or limestone, calcium carbonate, titanium dioxide, blanc fixe, satin white, or the like. It is generally preferred to use as much filler as is practical in the production of a desired end product since the filler is the least expensive ingredient. Factors which determine the maximum usable amount of filler are such necessary qualities as film strength, adhesive strength, water repellency, and the like.

The final result of compounding must be a perfectly smooth and uniform fluid mass having a predetermined viscosity range as required for proper operation of the coating equipment. Difficulty occurs with the powdered mineral fillers which have a tendency to flocculate and agglomerate. Difficulty also occurs in dispersing the exceptionally viscous polymeric thickeners and other components considered necessary in the mixture. Dry powdered cellulose derivatives and powdered pre-swollen starch are themselves difficult to disperse in water. The spray-dried granular cold water swelling starch of this invention shares this undesirable quality unless it is suitably modified as described hereinafter.

To aid dispersion a minor amount of finely comminuted tricalcium monophosphate is added to the starch product of this invention. The preferred quantity of tricalcium monophosphate is from about 2% to about 10% by weight of the mixture. When tricalcium monophosphate has been intermixed with the granular starch product, not only is there a significant improvement in the dispersibility of the product but also the bulk density of the product is increased. The tricalcium monophosphate containing product generally has a density of from about 36 pounds/cubic foot to about 42 pounds/cubic foot. The presence of tricalcium monophosphate makes the product very free flowing. That is, the product flows very much like a liquid. The dispersibility of the product in aqueous media is significantly improved by the tricalcium monophosphate addition.

The addition of an agent which slightly retards wetting of the product also improves its dispersibility in aqueous liquids. It is believed that the hydrophobic agent decreases the rate of wetting of individual agglomerates of the starch product which, in the art, are termed "fish eyes". This in turn, it is believed, prevents the entrapment of dry starch sealed within the wet surfaced agglomerates. The result of the addition of a hydrophobic agent is a marked improvement in the rate and uniformity of dispersion. Examples of hydrophobic agents found useful include fatty acid salts, chemically derivatized fatty acids, hydrocarbons, hydrocarbon derivatives, and the like.

Commercially available hydrophobic agents include Tween 20, a polyoxyethylenesorbitan monolaurate nonionic surfactant produced by Atlas Chemical Industries, Wilmington, Del.; Emersoft 7700, a nonionic fatty acid derivative supplied as a textile lubricant and softener by Emery Industries, Inc., Cincinnati, Ohio; Twitchell Oil 7231, a sulfonated mineral oil textile softener and lubricant also produced by Emery Industries; common commercial corn oil; and white mineral oil. Of these, Emersoft 7700 is the preferred hydrophobic agent.

The granular, cold water swelling, starch product preferred for use in latex compounds contains both powdered tricalcium phosphate and a hydrophobic agent in the desired amounts according to this invention to increase its water dispersibility. The most preferred product comprises a substantially non-birefringent, cold water swelling, granular starch powder containing about 2% to about 10% by weight of tricalcium phosphate and about 0.1% to about 3% by weight of Emersoft 7700 or the like nonionic fatty acid derivative. It is free-flowing in the dry state and disperses readily in an aqueous medium.

A very surprising fact about the granular starch product of the invention is that, although aqueous slurries made from the starch product are relatively low in viscosity, the addition of the starch product to a latex results in marked increases in viscosity of the latex composition while imparting other desirable rheological properties.

Latex compositions for adhesive and laminating applications preferably have viscosities of from about 200 centipoise to about 50,000 centipoise. The suitable addition of the granular starch product of the invention to a latex of very low viscosity will cause the viscosity of the latex to increase until it falls within this range. The granular starch product is less expensive than commonly used latex thickening agents, such as polyacrylic acid or hydroxymethyl cellulose. This is, of course, very desirable from a commercial standpoint.

Specific areas in which the granular starch product may be advantageously used as an additive to a latex include the "white-backing" of throw rugs, the back-coating of drapery and upholstery fabrics, the laminating of a backing "scrim" to tufted carpeting or of a pile lining to rubber or a textile, the manufacturing and level coating of shade cloth and holland cloth, the coating of various grades of paper stock, and the like.

The granular starch product may be used with any water-based or dissolved resin composition and a composition of increased viscosity will be obtained. Examples of resins to which the granular starch product may advantageously be added include natural rubber, vinyl, acrylic, methacrylic, styrene, butadiene resins, styrene-butadiene resins, and combinations thereof.

The level at which a thickener may be used to effect a given degree of thickening will depend not only on the native viscosity of the thickener itself, but also on the specific combination of latex and fillers to be used and on the ratio of solids to water. For effective thickening, at least about 4 parts of the granular starch product of the invention must be used for each 100 parts of base resin dry weight basis. Preferably from about 4 parts to about 25 parts of the product are used for each 100 parts of base resin.

The total solids content of the latex compositions differ greatly depending on the desired end uses. Generally the latex compositions contain from about 40% to about 75% by weight of solids dispersed in an aqueous liquid.

In commercial coating, fiber-bonding, laminating and the like procedures, it is desirable that the coating or adhesive adhere tenaciously to fibers, resist abrasion and repeated washing or dry cleaning, and supply a controlled degree of water repellency and flexibility to the coated material. Heretofore, it has been the common experience in the art that the addition of aminoplast resins, (e.g. aminealdehyde condensation products such as urea-formaldehyde, melamine-formaldehyde, and the like), effects some improvement in these several properties. Minor savings in coating cost are realized due to the relatively low cost of the aminoplasts. However, it also appears that the aminoplasts promote the setting or gelation of the coating formulation as it is held prior to application. In the vernacular of the art, the "pot-life" of such formulation is reduced below a reasonable level.

Coating and lamination adhesive formulae rarely employ more than about 10 parts aminoplast per 100 parts of latex, due to the effect of the former on pot life. Another aspect of this invention is that the granular pre-swollen starch product of this invention can be combined with an aminoplast as an additive for latices in the proportion of about 1 to about 4 parts by weight of the starch product for each part of aminoplast resin. The aminoplast resin and starch product composition according to this invention can be used as an additive for latex compositions and as a replacement for from about 10% to about 90% of the latex in the formulae while maintaining useful pot life and suitable coating performance.

The aminoplast resins comprise a large family of specific chemical entities which differ as to utility in specific applications. Of these, urea-formaldehyde resins are generally least expensive and, when used together with the product of the invention, perform suitably as a replacement or supplement for latex solids. Typically, such resins are used together with a curing-catalyst. A satisfactory catalyst for the composition described herein that contains a urea-formaldehyde condensation resin is any of a variety of inorganic ammonium salts. In the combination herein referred to, the presence of an aminoplast curing-catalyst has generally been found of marginal value. That is, it is not a necessary ingredient. The use of urea-formaldehyde resins in combination with the granular starch product is preferred by reason of the resulting economy and water resistance obtained. The mole ratio of urea or melamine to aldehyde is not critical and may be from 0.3 – 7.0 to 1.

The following examples describe specific demonstrations of the process of making the improved substantially non-birefringent, cold water swelling, granular starch product of the invention. These examples are meant to be illustrative, and the invention, of course, is not to be limited thereto. All parts and percentages are by weight unless expressly stated to be otherwise.

EXAMPLE I

Preparation of Non-Birefringent Cold Water Swelling Granular Starch Product

An aqueous slurry of starch containing 8 percent starch based on total slurry weight was formulated. Steam at a pressure of about 17 psi was injected into the slurry in a steam injection cooker. The slurry attained a temperature of 167° F. ± 3° F. The slurry was held at this temperature for 30 seconds. The starch was immediately dehydrated by being spray dried.

Addition of cold water to the recovered dehydrated product caused it to return to the original partially swollen state. Microscopic examination of the swollen granules under polarized light revealed that they were substantially non-birefringent. The Brookfield viscosity of a 10% slurry made by carefully dispersing 25 g. dry basis starch product in 225 g. of water at room temperature with agitation at 1500 rpm for 2 minutes was determined to be 400 cps using a number 3 spindle at 20 rpm. The density of this spray dried granular product was 29.3 pound per cubic foot.

EXAMPLE II

Dispersibility Tests with Tricalcium Monophosphate

In dispersibility testing, 25 g d.b. of the starch product of Example I was rapidly added to 225 ml. $H_2O$ plus the reagent shown stirred at low shear (200 rpm, 2-inch half-moon stirrer) for two minutes, then tested for viscosity.

The following results were found as follows:

| Added | To | Viscosity 20 rpm, cps |
|---|---|---|
| Starch | Water | 400[a] |
| Starch | Water + 1 ml 5 N HCL | 400 |
| Starch + 5% TCP | Water* | 1350 |
| Starch + 5% TCP | Water + 1 ml 5 N HCL | 3000 |

[a]Control prepared by dusting starch into water with 1500 rpm agitation, followed by viscosity measurement after 2 minutes.

EXAMPLE III

Dispersibility with Hydrophobic Agents

Each hydrophobic agent was dissolved or thinned in an organic solvent and uniformly mixed with the starch product of Example I at a level such that 0.1 g. of the hydrophobic agent is available for each 10 g. dry basis of the starch product. The resulting wetted material was spread out and oven-dried at 60° C. to produce a friable starch powder with a uniformly absorbed hydrophobic agent. As a final step, each dried sample was blended with 5% tricalcium monophosphate. These products when tested for dispersibility gave the following results:

| Hydrophobic Agent | Dispersibility[a] Test Viscosity cps | Coating Dispersibility[b] Test Viscosity cps | Fish-Eye[b] Wet Weight g. |
|---|---|---|---|
| TWEEN 20 | 1400 | 540 | 8.5 |
| Emery Twitchell Oil 7231 | 840 | 160 | 16 |
| Mineral Oil | 760 | 150 | 15 |
| EMERSOFT 7700 | 1480 | 670 | 3 |
| None | 620 | 30 | 35 |

[a]Dispersibility Test as shown in Example II.
[b]A more stringent test of dispersibility was devised with involved layering the dry, coated sample in a dry 400-ml beaker, then pouring 230-ml water into the beaker from a 250-ml separatory funnel during a 110-sec period (end of funnel stem set 4 in. above beaker bottom). The mass was then stirred for 2 min. at 200 rpm with a "high-torque" stirrer; fish-eyes screened out, washed and weighed on a #10 screen, and viscosity measured on the paste.

EXAMPLE IV

Density of Coated Starch Product

Tricalcium monophosphate, 5 parts by weight, and melted Emersoft 7700, ½-part by weight, were dry-blended with 100 parts of the dry granular starch product of this invention. The resulting starch product was very free flowing, almost like a liquid, and would disperse readily in cold water. It had a bulk density of about 39 pound/cubic foot.

EXAMPLE V

Use of Granular Starch Product in Latex

This example illustrates that the substantially non-birefringent cold water swelling granular starch product of the invention increases the viscosity of a latex to a desirable value. The latex made as described hereinafter was found to have excellent properties as a coating and laminating adhesive.

A representative coating compound was formulated by adding to 68 g. of water, 100 g. of precipitated calcium carbonate, 64 g. of a styrene-butadiene latex (Dow 881 Latex, manufactured by Dow Chemical Co.) having 50% solids and 50% water, and 4 g. of a urea-formaldehyde resin having a mole ratio of urea to formaldehyde of about 2:1. The resulting latex had a viscosity of about 40 centipoise at a solids level of 57.6 by weight.

Four grams of the tricalcium phosphate containing product of Example I were added to the mixture. The viscosity of the solution increased to about 15,200 centipoise at a solids level of 58.3% by weight.

Two additional grams of the tricalcium phosphate containing product were added to the solution and the viscosity increased to about 28,000 centipoise at a solids level of 58.7% by weight.

Two additional grams of the tricalcium phosphate containing product were added to the solution and the viscosity increased to about 50,000 centipoise at a solids level of 59.0% by weight. Further additions above this level were impractical due to the great difficulty in adding additional product to give a uniform mixture.

The above series of formulating steps was repeated, but substituting for the several increments of the tricalcium phosphate containing product a commercial polyacrylic acid-derived thickener at identical dry solids levels. Appropriate corrections were applied for water content of the thickener, which is impractical to handle above the 12% solids level. At each level of addition the viscosity values cited above were virtually duplicated.

EXAMPLE VI

Aminoplast Resin-Starch Product Composition for Replacement of Latex

A latex formulation was prepared by first dispersing an aminoplast resin (urea-formaldehyde resin) in water and dusting the starch product of Example I into the dispersion under high speed agitation to form the desired aminoplast-starch composition. To complete the latex preparation, the latex (styrene-butadiene resin) was added to the aminoplast-starch composition. Then, filler was added to a total solids level of 40 percent by weight. With the aminoplast-starch containing latex, ammonium chloride is added as a curing agent. The final formulation is as follows:

| Component | Dry Parts |
| --- | --- |
| Starch Product | 50 |
| Urea-Formaldehyde Resin | 25 |
| Latex (SBR) | 25 |
| Filler | 250 |
| Ammonium Chloride | 1.88 |

The aminoplast resin substantially non-birefringent starch combination had excellent pot life and a viscosity, for example, of about 8,600 to about 12,600 centipoise. The latex composition according to this example was evaluated as a laminating adhesive for textiles and carpets and gave superior results in comparison to controls not containing the aminoplast starch combination.

While the invention has been described in connection with specific embodiments thereof, it will be understood that it is capable of further modification, and this application is intended to cover any variations, uses, or adaptations of the invention, following, in general, the principles of the invention and including such departures from the present disclosure as come within known or customary practice in the art to which the invention pertains and as may be applied to the essential features hereinbefore set forth, and as fall within the scope of the invention.

We claim:

1. A process for producing an improved substantially non-birefringent cold water swelling granular starch product comprising:
   (a) heating an aqueous slurry of a granular birefringent starch at a temperature within the range from about 130° to about 190° F. for at least 15 seconds to about 60 seconds to substantially eliminate the birefringence of the starch and to partially swell the starch while retaining the granular structure;
   (b) separating and dehydrating the partially swollen non-birefringent starch granules; and
   (c) recovering a partially swollen substantially non-birefringent granular starch product characterized as having a viscosity from about 150 to about 650 centipoise at 10 percent solids after being dispersed in water at 1500 rpm for 2 minutes.

2. The process of claim 1 wherein the temperature falls within the range from about 160° to about 170° F. for at least about 30 seconds.

3. The process as in claim 1 wherein the separating and dehydrating comprises spray drying the granules to produce a starch product with a moisture content below about 20% by weight.

4. An improved substantially non-birefringent cold water swelling granular starch product having a moisture content below about 20% by weight characterized as having a viscosity from about 150 to about 650 centipoise at 10 percent solids after being dispersed in water at 1500 rpm for 2 minutes.

5. The product according to claim 4 which is further characterized as having a density of less than about 31 pounds per cubic foot.

6. The product of claim 4 containing from about 2% to about 10% by weight of tricalcium monophosphate and is free flowing.

7. The product of claim 4 containing a hydrophobic agent characterized in that it is readily dispersible in an aqueous liquid.

8. The product of claim 7 containing from about 0.1% to about 3.0% by weight of a nonionic fatty acid derivative.

9. The product of claim 4 containing an aminoplast resin at a ratio of aminoplast resin to starch product from about 1:1 to about 1:4.

10. A product useful as a thickening agent for latex comprising:
    (a) a substantially non-birefringent, cold water swelling, granular starch product characterized as having a viscosity from about 150 to about 650 centipoise at 10 percent solids after being dispersed in water at 1500 rpm for 2 minutes;
    (b) tricalcium monophosphate from about 2% to about 10% by weight; and
    (c) a hydrophobic agent.

11. A latex composition having a viscosity in the range from about 200 to about 50,000 centipoise comprising:
    (a) a latex resin; and
    (b) a substantially non-birefringent cold water swelling, non-crystalline granular starch thickening agent characterized as having a viscosity from about 150 to about 650 centipoise at 10 percent solids after being dispersed in water at 1500 rpm for 2 minutes, wherein said starch thickening agent is from about 4 parts to about 25 parts for each 100 parts of latex resin in said latex composition.

12. The latex composition of claim 11 wherein the latex resin is selected from the group of resins consisting of vinyl resins, acrylic resins, methacrylic resins, natural rubbers, styrene resins, butadiene resins, and combinations thereof.

13. The latex composition of claim 11 wherein the granular starch is uniformly mixed with from about 2% to about 10% by weight of a tricalcium phosphate dispersant.

14. The latex composition of claim 13 wherein the starch product of claim 15 is further admixed with a hydrophobic agent.

15. The latex composition of claim 14 wherein the hydrophobic agent is from about 0.1% to about 3.0% by weight of a nonionic fatty acid derivative.

16. The latex composition of claim 11 further comprising an aminoplast resin, characterized in that there is from about 1 to about 4 parts by weight of starch thickening agent for each part of the aminoplast resin.

* * * * *